United States Patent

[11] 3,573,392

[72] Inventor James R. Trammell
Parma Heights, Ohio
[21] Appl. No. 739,863
[22] Filed June 25, 1968
[45] Patented Apr. 6, 1971
[73] Assignee Scanfax Systems Corp.
New York, N.Y.

[54] SOLID STATE TAPE TRANSPORT CONTROL APPARATUS

3 Claims, 1 Drawing Fig.

[52] U.S. Cl. .......... 179/100.2
[51] Int. Cl. .......... G11b 15/08
[50] Field of Search .......... 179/100.2
(S), 100.3 (D); 242/188, 195; 274/4 (D), 11 (D)

[56] References Cited
UNITED STATES PATENTS
2,971,716 2/1961 Sampson .......... 179/100.2
3,208,682 9/1965 Pastor et al. .......... 242/195

*Primary Examiner*—Bernard Konick
*Assistant Examiner*—Robert S. Tupper
*Attorney*—Amster and Rothstein

ABSTRACT: An arrangement for controlling the recording head and the direction of magnetic tape movement in a tape recording machine is disclosed in which the translucency of the magnetic tape is monitored to detect the appearance of the leader and trailer portions of the magnetic tape.

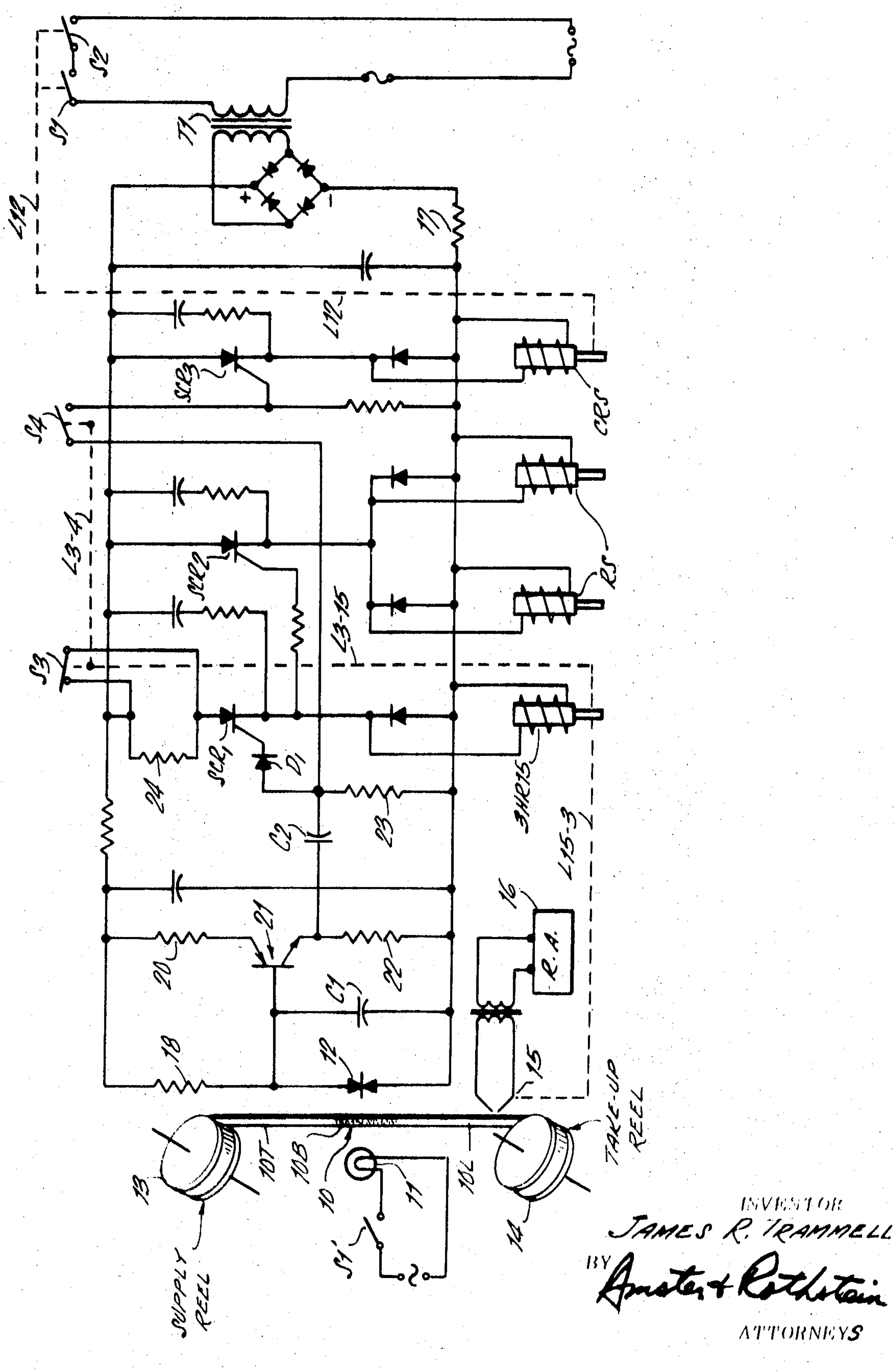
INVENTOR
JAMES R. TRAMMELL
BY Amster & Rothstein
ATTORNEYS

SOLID STATE TAPE TRANSPORT CONTROL APPARATUS

This invention relates to a magnetic tape control apparatus and more particularly to apparatus for controlling such tape during transcription or tape duplicating operations.

The growing popularity of magnetic tape systems has created a demand for production processes which can efficiently supply an increased volume or prerecorded tapes. Unlike longplaying records which can quickly be pressed from a master die, magnetic tapes can only be duplicated by having each of the elemental portions in the entire length of the tape pass successively beneath a recording head. Since this process itself takes a comparatively long time it becomes important to reduce the time taken by processes and functions ancillary to the actual recording. While it is a comparatively simple task to thread a single tape from the supply reel to the takeup reel across the recording head and capstans, the process entails the additional step of advancing the beginning portion of the tape, called the leader, to the point where actual recording may begin. While this process can be done manually, to do so is wasteful of time. Furthermore, when it is desired to record on tapes in cassettes or cartridges it is not easy to detect when the leader has been completely or sufficiently advanced to permit recording to begin.

After the completion of the recording process the tape should, of course, be rewound and it is immediately apparent that it is impractical to have operators constantly observing the tapes to determine when this has occurred. Likewise, it is undesirable to permit recording on the leader or trailer portions of the magnetic tape because these portions are built for mechanical connection to the supply and takeup reels rather than for recording, and, accordingly, do not have the magnetic oxide coating necessary for proper recording.

Accordingly, an object of the present invention is to provide automatic arrangement for reliably recording program material on magnetic tapes.

It is another object of the present invention to assure that recorded material will be properly positioned with regard to beginning and ending of the tape.

The foregoing and other objects of the present invention are achieved in one illustrative embodiment in which a control light source shining through the tape is monitored to distinguish the leading and trailing portions of a tape from the main portion of the tape on which the program material is to be recorded, and in which the monitor apparatus is used to control the recording and rewinding of the tape as well as the mechanical positioning of the recording head and release of the tape cassette at the completion of tape rewind after recording.

The foregoing and other objects and features of the present invention may become more apparent from the following specification and drawing, the single FIGURE of which depicts in schematic form an illustrative embodiment of a tape duplicator control apparatus according to the principles of the present invention.

In the drawing the tape 10 is shown at the left between a control light source 11 (which may illustratively be provided by a grain-of-wheat lamp inside a fixed post on the duplicator machine) and a photodiode 12. The tape may be initially wound on a supply reel 13 and arranged to be transferred to a takeup reel 14, which reels may be separate items or advantageously arranged in a cartridge assembly known as a tape cassette. In the latter case, there is usually provided an aperture in the tape cassette through which the control light source 11 may shine through the tape 10 to illuminate photodiode 12, and a hole through which the control light post may enter the cassette. This arrangement permits photodiode 12 to respond to the different densities of the magnetic tape 10 as the tape is wound between the supply reel and the takeup reel.

In the drawing, the leader portion 10L, and the trailer portion 10T, of tape 10 are shown attached to the takeup and supply reels 14 and 13, respectively, and the main body of the tape 10B is shown between the control lamp 11 and photodiode 12. The tape has been shown in this manner solely for the purpose of illustrating the three different segments of the tape and it is to be understood that normally the length of tape and the usual distance between reels 13 and 14 would not permit all three segments of tape 10 to be visible at the same time. It is to be further understood that both the leading and trailing portions 10L and 10T of the tape are more translucent then the main body 10B of tape 10 inasmuch as those portions do not have the customary recording oxide applied thereon.

Such conventional items as the capstan drive for imparting motion to the tape as well as the drive motors for reels 13 and 14 being well known are not shown in the drawing. The recording head 15 and recording amplifier 16 have been shown between the control lamp 11 and the takeup reel 14. This positioning is by no means critical and it will be apparent that the recording head 15 may as conveniently be positioned between the lamp 11 and supply reel 13.

When the tape cassette is initially placed in the duplicator machine chambers power switches S1 and S2 are actuated. In addition, switch S1′ is operated closing a circuit for control light source 11 and the drive motors (not shown) for moving the tape are energized but the tape is not put in motion until actuate switch S3 is closed. When actuate switch S3 is operated, an associated mechanical linkage (not shown) mechanically moves recording head 15 against tape 10. In addition, such mechanical linkage also would position the conventional capstan pressure roll (not shown) against the tape to set the tape in motion. A mechanical linkage L3–4 interconnects switches S3 and S4 so that whenever switch S3 is closed, switch S4 is opened, and vice versa. A mechanical linkage L3–15 is coupled to linkage L3–4 so that when head release solenoid 3HR15 is actuated switch S3 will be opened and switch S4 closed.

When the tape cassette is initially placed in the duplicator machine, it will be assumed that most of tape 10 is wound on supply reel 13 so that the leader portion 10L of magnetic tape 10 is interposed between control lamp 11 and photodiode 12. As mentioned previously, the leader portion 10L of the tape is more translucent than the main body 10B of the magnetic tape. Before actuate switch S3 is operated, photodiode 12 is placed in the conducting state due to the light flux passing through the translucent portion 10L of the tape. Photodiode 12 in the conducting state causes transistor 21 to turn on. Capacitor C2 passes the positive pulse appearing at the cathode of transistor 21 to diode D1. Diode D1 is forward biased and passes the positive pulse to the gate electrode of silicon control device SCR1. However, until actuate switch S3 is closed, silicon device SCR1 cannot be turned on due to the high impedance of resistor 24 in series with its anode. Capacitor C2 accordingly charges in series with resistor 23.

When switch S3 is actuated, resistor 24 is shunted down and an operating current path is prepared for silicon control device SCR1. However, SCR1 is still not turned on inasmuch as capacitor C2 rapidly charges in the interval after the turning on of transistor 21 so there is no positive pulse available when switch S3 is operated.

The tape is set into motion by a mechanical linkage operated when S3 is actuated. This linkage (not shown) moves the capstan pressure roll (not shown) against the tape. When the main body of the tape begins to pass between light source 11 and photodiode 12, less light flux reaches the photodiode 12 because of the relatively opaque nature of the main tape body 10B and photodiode 12 is rendered nonconducting. Transistor 21 turns off due to the high impedance of resistor 20, and capacitor C2, connected to the cathode of transistor 21, commences to discharge. The negative pulse produced at the junction of capacitor C2, resistor 23 and diode D1 is likewise ineffective to turn on silicon device SCR1 inasmuch as pulses of this polarity are blocked by diode D1. Recording of the main body 10B of the tape passing against head 15 takes place in accordance with the signals supplied to head 15 by recording amplifier 16.

When the tape has been completely recorded, the trailer portion 10T begins to appear between light source 11 and photodiode 12. Photodiode 12 will be turned on once again by the greater light flux passing through the more translucent portion 10T of the tape. Photodiode 12 turning on will turn on transistor 21, causing a positive pulse to be applied through capacitor C2 and diode D1 to the gate electrode of silicon control SCR1.

Silicon control device SCR1 turning on turns on silicon control device SCR2. Silicon control device SCR1 turning on also completes a low impedance operating current path for head release solenoid 3HR15 which operates to pull recording head 15 away from tape 10 via linkage L15-3. Silicon control device SCR2 turned on energizes rewing solenoids RS which reverse the direction of the tape. At the same time, head release solenoid 3HR15, via linkage L3–15, releases actuate switch S3. Switch S3 released via linkage L3–4 operates switch S4. Switch S4 operated connects the junction of capacitor C2 and resistor 23 to the gate of silicon control device SCR3. However, the positive pulse appearing at the junction of capacitor C2 and resistor 23 dissipated with the turning on of silicon control devices SCR1 and SCR2, and so despite the fact that at the commencement of the rewinding of the tape some of the trailing translucent portion 10T of tape 10 may still be between lamp 11 and photodiode 12, silicon control device SCR3 will not be turned on at this time.

The opening of switch S3 causes silicon device SCR1 to turn off inasmuch as the high impedance of resistor 24 prevents sustained conduction. Silicon device SCR2, however, remains conducting keeping rewind solenoids RS energized for the rewinding of the tape. As the main, relatively opaque body 10B of tape 10 passes between control lamp 11 and photodiode 12 during rewind, transistor 21 is turned off. Rewinding continues until all of the main body of the tape is returned to supply reel 13. When the relatively translucent leader 10L of the tape appears between the lamp 11 and photodiode 12, photodiode 12 turns transistor 21 on. Transistor 21 turning on applies a positive pulse through capacitor C2 and switch S4 to the gate of silicon device SCR3. Silicon device SCR3 turns on energizing cassette release solenoid CRS. Cassette release solenoid so energized operates linkage L12 to open switches S1 and S2 cutting off current to silicon control device SCR3 and rewind solenoids RS, thereby halting the tape. The tape has now been completely rewound and may be removed from the duplicating machine.

Accordingly, it is seen that an apparatus for automatically winding and rewinding a magnetic tape has been provided which controls the positioning of the magnetic recording head, and the direction of tape movement by monitoring the translucency of the magnetic tape in the proximity of the recording head, which ignores the greater translucency of the leader portion of the magnetic tape when the cassette is initially loaded for recording, which recognizes the greater translucency of the trailer portion upon completion of recording to initiate tape rewind and which recognizes the reappearance of the leader portion of the tape at the completion of rewinding to stop the tape and release the cassette.

The foregoing has been illustrative of the principles of the present invention; numerous other embodiments may be devised by those skilled in the art without departing therefrom.

I claim:

1. An arrangement for automatically controlling the movement of a magnetic tape, said tape having a relatively opaque record portion and relatively translucent leader and trailer portions adjoining the ends of said record portion comprising a magnetic recording head adapted to be placed in recording and nonrecording positions with respect to said tape, means for monitoring the translucency of said tape in the proximity of said recording head, first solenoid means for controlling the positioning of said recording head, second solenoid means for reversing the direction of tape movement, first silicon control device means in circuit with said first solenoid means and second silicon control device means in circuit with said second solenoid means, said second silicon control device means being connected to be turned on by conduction of said first silicon control device means, switch means operable to complete a sustainable conduction path to said first solenoid means, linkage means coupled to said switch means and to said recording head and operable to place the head in said recording position when said switch means is operated to complete said conduction path to said first solenoid means, and pulse coupling means connecting said monitoring means to said first silicon control device means, said pulse coupling means turning on said first silicon control device means when said monitoring means detects said trailer portion in the proximity of said recording head, said first solenoid means being operated in response to the turning on of said first silicon control device means to operate said linkage means to release said switch means and to restore said head to said nonrecording position.

2. An arrangement according to claim 1 the combination further comprising third silicon control device means and third solenoid means in circuit with said third silicon control device means, second switch means operable to connect said pulse coupling means to said third silicon control device means, and means controlled by said third solenoid means to turn off said second silicon control device means, said pulse coupling means turning on said third silicon control device means when said monitoring means detects said leader portion in the proximity of said recording head.

3. An arrangement according to claim 2 the combination wherein said first and second switch means are alternate acting and wherein said second switch means is operated when said first switch means is released by said turning on of said first silicon control device means.